S. De VEAUX.
CORN-PLANTER.
No. 173,394. Patented Feb. 15, 1876.
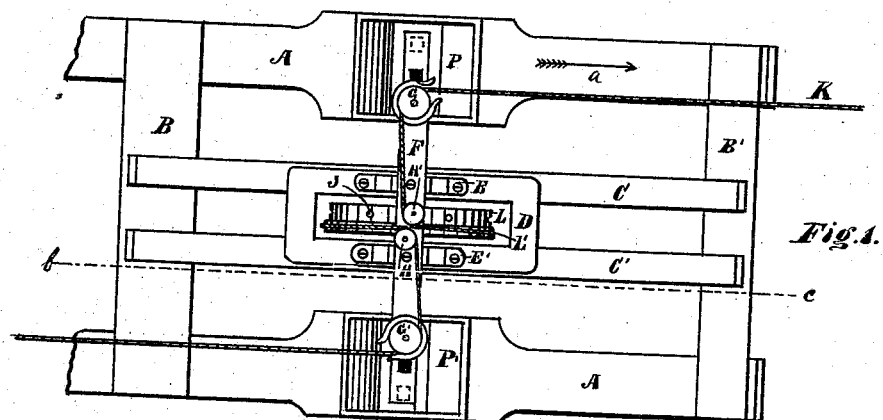
Fig. 1.
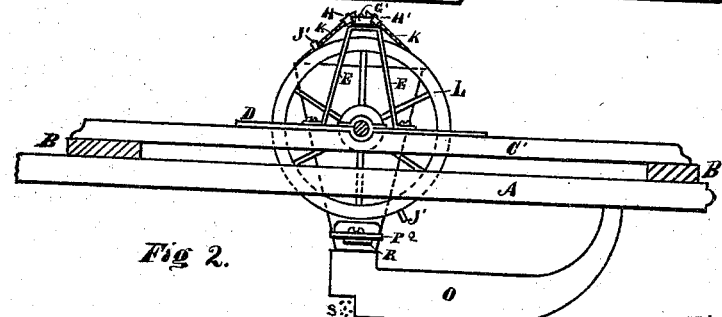
Fig. 2.
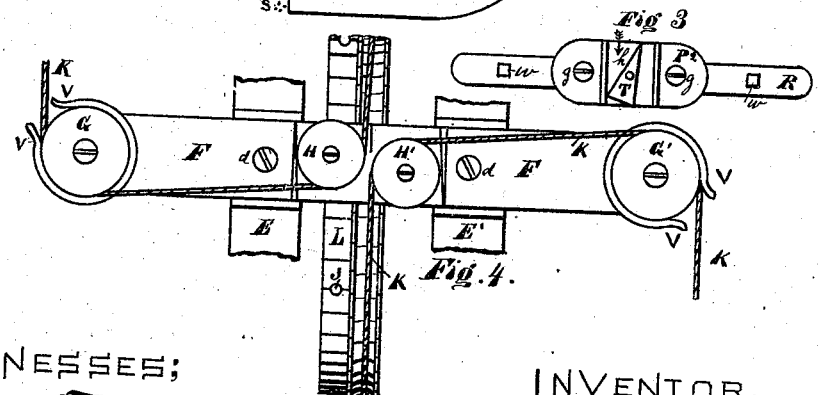
Fig. 3.
Fig. 4.
WITNESSES:
Erastus J. Russell
J. J. Lang
INVENTOR.
Samuel De Veaux.
Per E. O. Frank
Atty.

UNITED STATES PATENT OFFICE.

SAMUEL DE VEAUX, OF LA FAYETTE, INDIANA.

IMPROVEMENT IN CORN-PLANTERS.

Specification forming part of Letters Patent No. 173,394, dated February 15, 1876; application filed September 25, 1875.

*To all whom it may concern:*

Be it known that I, SAMUEL DE VEAUX, of La Fayette, Tippecanoe county, State of Indiana, have invented a new and useful Improvement in Check-Rowers to be attached to Corn-Planters, for the purpose of checking off the rows of corn to be planted, and at the same time plant the corn automatically, of which the following is a specification, reference being had to the accompanying drawings.

My invention consists of the arrangement of a feed-wheel, having a part of its face or periphery constructed with a groove or sheave for a rope to work in, and the face of the pulley other than the sheave is perforated with a number of holes, in which are inserted one or more spacing and shifting pins, which operate upon an oscillating or vibrating V-shaped cam alternately on each side as the wheel revolves, the cam being arranged at the bottom of the feed-wheel, and attached to the slide or gate of the grain-boxes, so as to operate by means of the feed-wheel, and simultaneously open and close the parts in each grain-box, and allow a certain amount of grain to be deposited from each box at the same time, and to then close the ports, and, after moving a certain distance ahead again, open other ports and deposit more grain, all deposits of grain being at an equal distance apart, the attachment being operated to space and drop the grain at equal distances by means of a rope which is stretched across the field and attached to stakes driven into the ground or secured to the fences, the rope passing around proper guide-sheaves to carry it onto the sheave of the feed-wheel, and also to guide the rope as it leaves the machine, and as the corn-planter is drawn across the field the rope performs the work of dropping the corn to be planted, and checking off the rows, even without the aid of an extra man on the machine, and also saves the time required to mark off the field in a transverse direction.

Figure 1 represents a plan view of my improved check-rower and planter. Fig. 2 is a sectional side elevation of the same taken through the line $b\,c$ of Fig. 1. Fig. 3 is a plan view of the grain-box, slide, or gate, showing the V-shaped vibrating cam, which is operated by the spacing-pins in the feed-wheel. Fig. 4 represents an enlarged plan view of the arrangement of the sheaves on the cross-bar above the feed-wheel, and the manner in which the rope is conducted onto the feed-wheel and off from it.

A A represent the frame of any corn-planter, which is provided with the ordinary grain-boxes P P¹. The side frames over the openers O are usually connected together by bars B B′, and to these bars may be attached the bars C C′, upon which is secured the frame D of my improved attachment. To the frame D is secured the uprights E E′, shown in Figs. 2 and 4, and on the top of these uprights is fastened the cross-bar F, which is provided near its center on the top with two sheaves, H H′, which are pivoted, and are inclined in opposite angles, as shown at H H′ in Fig. 2, thus placing the sheaves in line with the sheave L′ of the feed-wheel L. On the extreme ends of the bar F are also pivoted the sheaves G G′, and each is provided with a rope-guide, V V, arranged and pivoted with the sheaves so that they can be reversed when necessary. To the frame D, near its center on each side, are arranged journal-boxes, in which works the shaft that supports the feed-wheel L. The face of this wheel on one side is provided with the groove or sheave L′, and the other part of the face of the wheel is provided with a number of holes, J, in which the spacing and slide shifting-pins J′ are inserted. At the bottom of the grain-boxes P P¹ is arranged the slide or gate R P², the gate P² operating in the bottom of each grain-box, so as to open or close the ports $w\,w'$, and allow the usual quantity of grain to be conveyed to the ground at the rear end of the sled or ground-opener O. To this slide or gate P² is attached the vibrating cam T. (Shown in Fig. 3.) The V-shaped cam T is formed hollow, and is provided with a pressure-spring (not shown) in the hollow part, that retains the cam in any position that the pins J′ of the feed-wheel L leave it, as shown in Fig. 3, or reversed. As the feed-wheel L is revolved the pin J′ comes in contact with the point of the V-shaped cam T in the direction of the arrow $h$, and as the pin passes through the space at the side of the cam T the slide R is forced to one side, thus bringing the ports $w\,w'$ opposite corresponding ports in the bottom of the grain-boxes P P¹, and depositing the grain that was in them on the ground; and the spring that is under the vibrating cam T prevents the cam from jarring or moving back until the planter has been advanced its proper distance, when the next pin J' in the feed-wheel L again strikes the vibrating cam on the opposite side, and moves the slide R back again, thus opening the other ports in the grain-box, and again depositing the grain at an equal distance apart, all of which is automatically performed, and does not require the attention of an extra man. The rope K is stretched across the field, and secured in any manner, and as the machine travels across the field in the direction of the arrow $a$, Fig. 1, the rope K runs twice around the sheave G, then half around the sheave H', and then passes down and around the sheave L' of the operating-wheel L, and leads off from the feed-wheel L by means of the other sheaves H and G', thus causing the feed-wheel L, with its pin or pins J, to operate on each side of the vibrating V-shaped cam T, which, in turn, operates the slide R, and the field is spaced off and checked, and the grain planted, all at the one operation. After crossing the field the machine is turned around, and the rope K reverses the position of the rope-guides V V automatically, but the vibrating V-shaped cam must be lifted out and turned end for end on the cam-guide P². In starting back across the field, after turning around, it may become necessary to change the pins J', and place them in other holes in the feed-wheel L, so as to drop the grain in line with the other grain dropped in coming across the field the opposite way.

What I claim as new, and wish to secure by Letters Patent, is—

1. The feed-wheel L, constructed with a groove, L', to carry the rope K, and a series of pin-holes, J, to receive the pins J' on its periphery, and arranged, as described, to operate in the frame D of a corn-plow, and produce a feed-motion to the slide R by means of the cam T, substantially as set forth and described.

2. The frame D, provided with uprights E E', on which is secured the bar F, arranged with its upper face near the center, inclined in opposite directions to receive the inclined pulleys or sheaves H H', so as to allow the rope K to be carried from either one of them, either onto or off of the feed-wheel L, all arranged to operate in connection with the sheaves G G' at the ends of the bar F, substantially as set forth and described.

3. The V-shaped vibrating cam T, arranged as described, and operated in combination with the pins J' of the feed-wheel L, to move the slide R, substantially as set forth and for the purpose described.

4. The combination of sheaves G G' H H', bar F, uprights E E', feed-wheel L, pins J', cam T, and slide R, all arranged to be operated by the rope K in the manner specified, and for the purposes set forth and described.

In testimony whereof I have signed my name to this specification in the presence of two subscribing witnesses.

SAMUEL DE VEAUX.

Witnesses:
ERASTUS T. BUSSELL,
J. S. LONG.